United States Patent [19]

Chen

[11] Patent Number: 5,007,302
[45] Date of Patent: Apr. 16, 1991

[54] ALIGNMENT APPARATUS FOR A STROKE CONTROLLING MECHANISM OF A MACHINE TOOL

[76] Inventor: Tien C. Chen, No. 11, Chiu Chia Lane, Sung Chu Li, Pei Tun Chu, Taichung, Taiwan

[21] Appl. No.: 414,693

[22] Filed: Sep. 29, 1989

[51] Int. Cl.$^5$ .................. F16H 53/00; G01B 3/02
[52] U.S. Cl. ................... 74/568 R; 74/567; 74/568 T; 33/645; 33/519
[58] Field of Search .......... 74/567, 568 R, 568 T, 74/838; 33/534, 533, 519, 645, 600

[56] References Cited

U.S. PATENT DOCUMENTS

| | | | |
|---|---|---|---|
| 2,888,837 | 6/1959 | Hellmann | 74/568 |
| 3,234,814 | 2/1966 | Buckeridge et al. | 74/568 |
| 3,285,095 | 11/1966 | Rockola | 74/568 |
| 3,988,553 | 10/1976 | Astle | 74/568 T |
| 4,620,510 | 11/1986 | Feuling | 74/567 |
| 4,723,517 | 2/1988 | Frost | 74/838 |

FOREIGN PATENT DOCUMENTS

| | | | |
|---|---|---|---|
| 0340128 | 11/1989 | European Pat. Off. | 74/567 |
| 0055939 | 9/1952 | France | 74/568 |
| 0177357 | 8/1987 | Japan | 74/567 |

Primary Examiner—Leslie A. Braun
Assistant Examiner—Winnie Yip
Attorney, Agent, or Firm—Poms, Smith, Lande & Rose

[57] ABSTRACT

An alignment apparatus for a stroke controlling mechanism having a cam shaft with a number of cams disposed around the cam shaft includes one or more circular lines and one or more sets of circular lines formed around the cam shaft. One or more longitudinal lines are formed on an outer surface of the cam shaft in a direction parallel to the longitudinal axis of the cam shaft. A check line is formed on a side surface of each cam. The cams are disposed on the cam shaft by aligning the check line of each cam with one of the longitudinal lines and by aligning each cam with one of the circular lines. A protractor is provided to measure the angles between the check line of each cam and the longitudinal line of the cam shaft.

3 Claims, 3 Drawing Sheets

ALIGNMENT APPARATUS FOR A STROKE CONTROLLING MECHANISM OF A MACHINE TOOL

FIELD OF THE INVENTION

The present invention relates to an alignment apparatus, and more particularly to an alignment apparatus for a stroke controlling mechanism of a machine tool.

BACKGROUND OF THE INVENTION

Manual machine tools and automatic machine tools, such as numerical control (NC) machines, are widely used nowadays. Since NC machines are very expensive and manual machine tools are not effective, a stroke controlling mechanism, such as a cam shaft which carries a number of cams; is provided for controlling the strokes of a number of tools so that the tools can machine a workpiece automatically.

One of the major limitations of such a machine tool using the stroke controlling mechanism is the procedure of fitting the cams on the cam shaft. The cams must be accurately aligned on the cam shaft in order to maintain a certain accuracy. The alignment of the cams on the cam shaft as known in prior art, has been done by the trial and error method. A sample is first machined and then measured to establish the variance from the required size. The cams are then adjusted accordingly until an accurate workpiece of the required size is produced. Normally, it takes hours to adjust the cams on one cam shaft. If two or more sets of cams are required for machining a workpiece, a more complex process and a much longer time are required to adjust the cams. In addition, the cams must be adjusted and/or the tools must be replaced in order to machine different workpieces. Therefore, the trial and error method must be used again and again, which is uneconomical and impractical.

The present invention has arisen to mitigate and/or obviate the afore-described disadvantages of the stroke controlling mechanism of machine tools.

SUMMARY OF THE INVENTION

The primary objective of the present invention is to provide an alignment apparatus for a stroke controlling mechanism of a machine tool which can adjust the relative angles between the cams and the cam shaft easily and quickly.

The present invention provides an alignment apparatus for a stroke controlling mechanism which includes generally a cam shaft with a number of cams disposed around the cam shaft. The alignment apparatus includes one or more circular lines and one or more sets of circular lines formed around the cam shaft. One or more longitudinal lines are formed on an outer surface of the cam shaft in a direction parallel to the longitudinal axis of the cam shaft. A check line is formed on a side surface of each cam. The cams are disposed on the cam shaft by aligning the check line of each cam with one of the longitudinal lines and by aligning each cam with one of the circular lines. A protractor is provided to measure the angles between the check line of each cam and the longitudinal line of the cam shaft.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
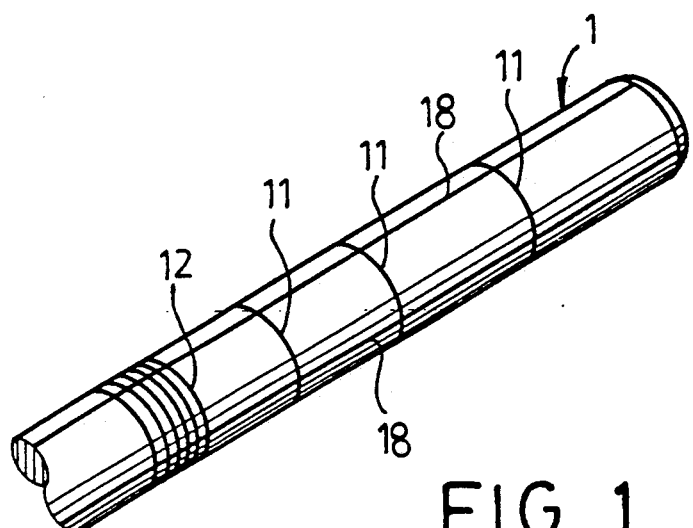
FIG. 1 is a perspective view of a cam shaft of the alignment apparatus in accordance with the present invention.
Figure 2:
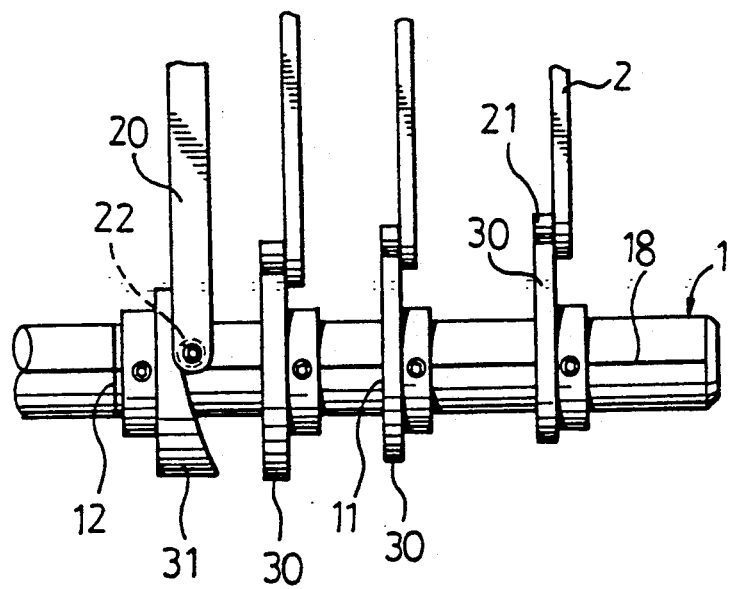
FIG. 2 is a side view illustrating an installment of the cams on the cam shaft.

Referring to the drawings and initially to FIGS. 1 and 2, illustrate the alignment apparatus for a stroke controlling mechanism of a machine tool in accordance with the present invention. The stroke controlling mechanism comprises generally a cam shaft 1 and a number of cams 30, 31 for controlling the working strokes of a number of arms 2, 20 of a number of tools (not shown), such as lathe tools, turning tools, shaping tools or the like. A roller 21, 22 or the like is provided on one end of each arm 2, 20 for contacting and bearing the cams 30, 31. As shown in FIG. 2, the axis of each roller 21 for the cams 30, such as eccentric cams, is parallel to the cam shaft 1 so that the peripheral surface of each roller 21 engages the outer peripheral surface of each cam 30, and so that the arms 2 can be actuated by the cams 30 to move away or to move toward the cam shaft 1 repeatedly. The axis of the roller 22 for the cam 31, such as a convex or concave flank cam, is substantially vertical to the cam shaft 1 so that the peripheral surface of the roller 22 engages the side surface of the cam 31, and so that the roller 22 and the arm 20 can be actuated to move in a direction parallel to the longitudinal axis of the cam shaft 1. The tools on the ends of the arms 2, 20 can thus be actuated accordingly.

As shown in FIG. 1, the alignment apparatus in accordance with the present invention generally comprises circular lines 11, 12 and longitudinal lines 18. Three circular lines 11 are provided on the cam shaft 1 so that the cams 30 can be disposed on the cam shaft 1 and aligned with the rollers 21 on the arms 2 quickly and easily by aligning the cams 30 with the respective circular lines 11. A set of circular lines 12 are provided on the cam shaft 1 so that the cam 31 can be disposed and aligned with one of the circular lines 12 depending on the required working strokes of the arm 20.

Figure 3:
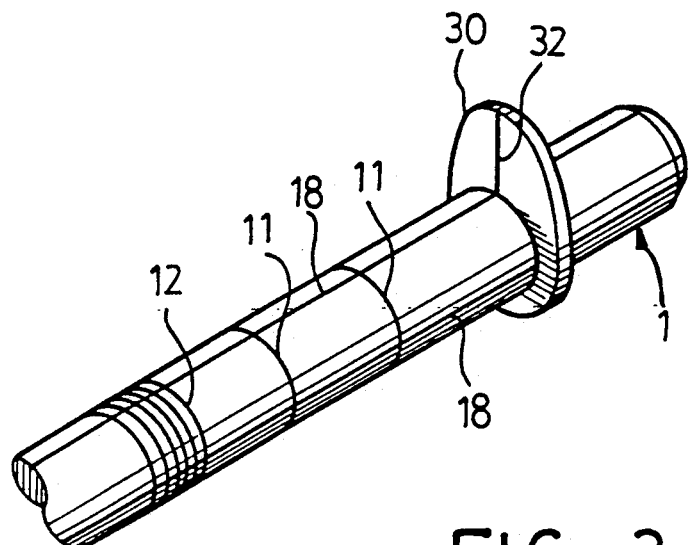
FIG. 3 is a perspective view of a cam shaft with a cam provided thereon.

Referring next to FIG. 3, three longitudinal lines 18 which are 120 degrees apart are provided on the outer surface of the cam shaft 1. One of the longitudinal lines 18 is provided at a relative degree, which is designated as 0 degrees, of the cross section of the cam shaft 1 and the other two are at 120 and 240 degrees therefrom. A check line 32 which is substantially extended radially is provided on one side surface of each cam 30 so that the cams 30 can be disposed on the cam shaft 1 at a specific angle by aligning the check line 32 with one of the longitudinal lines 18.

Figure 4:
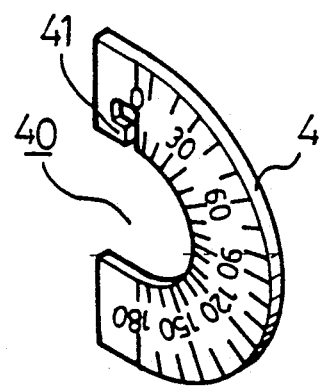
FIG. 4 is a perspective view of a protractor.

Referring next to FIG. 4, the protractor 4 is provided for measuring the angles of the cams 30 relative to the cam shaft 1 when the check line 32 of each cam 30 does not coincide with any of the longitudinal lines 18. The protractor 4 is substantially C-shaped with a notch 40 provided in the center portion thereof, the radius of the notch 40 is equal to the outer diameter of the cam shaft 1 so that the protractor 4 can be engaged on the cam shaft 1. A retainer 41 which is substantially L-shaped is formed on one free end of the protractor 4. The retainer 41 is resilient and preferably provided beside the graduation of the protractor which indicates 0 degrees. The retainer 41 slightly protrudes into the notch 40, i.e., the curvature of the free end of the retainer 41 is shorter than the radius of the notch 40 so that the protractor 4 can be rotatably engaged on the cam shaft by the resilient characteristic of the retainer 41. It is preferable that the protractor 4 is transparent.

Figure 5:
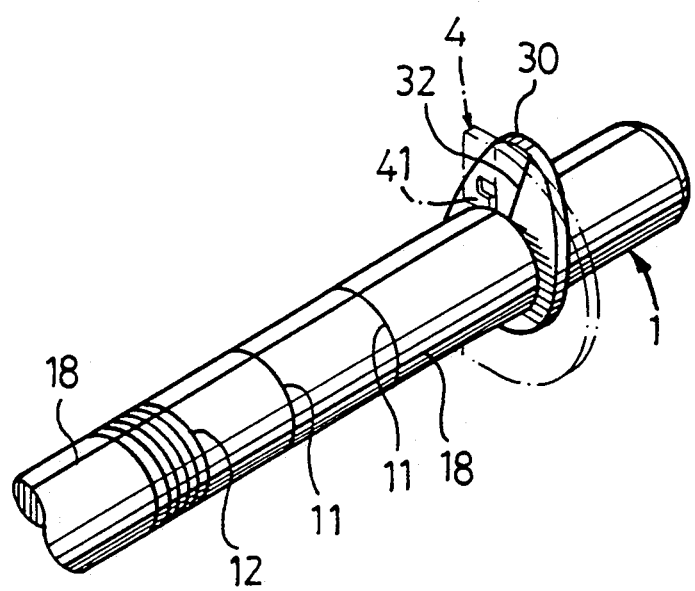
FIG. 5 is a perspective view illustrating the alignment of the cam on the cam shaft.

Referring next to FIG. 5, the protractor 4 is engaged on the cam shaft 1 adjacent to a side surface of the cam 30 where the check line 32 is provided. The graduation of the protractor 4 which indicates 0 degrees is aligned with one of the longitudinal lines 18, preferably the line designated as 0 degrees. The cam 30 can be rotated until the check line 32 of each cam 30 is aligned with the desired angles on the protractor 4 so that the direction of the cams 30 can be adjusted and checked quickly and easily.

The cam 31 can also be provided with a check line (not shown) on a side surface thereof for checking the angle of the cam 31 relative to the cam shaft 1. It is preferable that the position and the angle of each cam 30, 31 for a specific workpiece are recorded so that the cams can be disposed and adjusted again easily and quickly when the same workpiece is to be machined. Therefore, the users will never suffer the pain of the trial and error method again.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An alignment apparatus in combination with a stroke controlling mechanism, said stroke controlling mechanism comprising a cam shaft with a number of cams disposed thereon; said alignment apparatus comprising at least one circular line being formed around said cam shaft, at least one longitudinal line being formed on an outer surface of said cam shaft in a direction parallel to a longitudinal axis of said cam shaft, and a check line being formed on a side surface of each said cam; said cams being disposed on said cam shaft by aligning said check line of each said cam with said longitudinal line and by aligning each said cam with each said circular line; a removable C-shaped protractor mounted on said cam shaft for aligning of said cams on said cam shaft when said check line of each said cam is not aligned with said longitudinal line; a notch which has a diameter substantially equal to an outer diameter of said cam shaft being formed in a center of said protractor so that said protractor is engageable onto said cam shaft.

2. An alignment apparatus according to claim 1, wherein a retainer is formed on a free end of said protractor, preferably provided beside a graduation of said protractor which is designated as 0 degrees, so that said protractor is engagable onto said cam shaft and retained on said cam shaft by said retainer.

3. An alignment apparatus according to claim 2, wherein said retainer is substantially L-shaped.

* * * * *